No. 703,707. Patented July 1, 1902.
J. MORAN.
POTATO DIGGER.
(Application filed July 5, 1901.)
(No Model.) 2 Sheets—Sheet 1.

No. 703,707. Patented July 1, 1902.
J. MORAN.
POTATO DIGGER.
(Application filed July 5, 1901.)
(No Model.) 2 Sheets—Sheet 2.
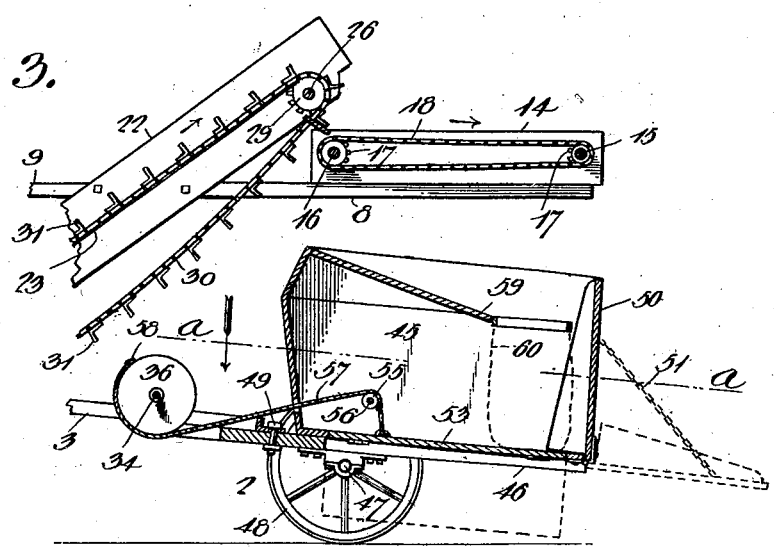
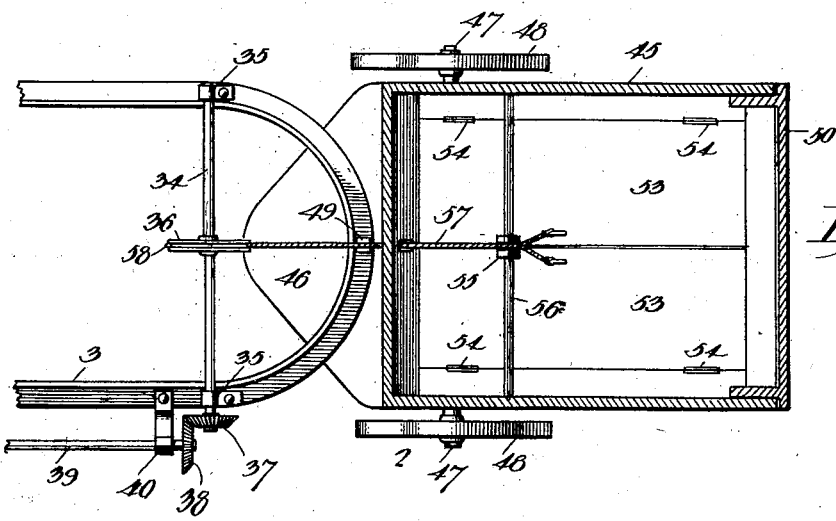
Witnesses
J. Frank Culverwell.
J. W. Garner
John Moran, Inventor.
by C. A. Snow & Co.
Attorneys

UNITED STATES PATENT OFFICE.

JOHN MORAN, OF BRADLEY, ILLINOIS.

POTATO-DIGGER.

SPECIFICATION forming part of Letters Patent No. 703,707, dated July 1, 1902.

Application filed July 5, 1901. Serial No. 67,199. (No model.)

*To all whom it may concern:*

Be it known that I, JOHN MORAN, a citizen of the United States, residing at Bradley, in the county of Kankakee and State of Illinois, have invented a new and useful Potato-Digger, of which the following is a specification.

My invention is an improved potato-digger which is adapted to dig the potatoes, separate the same from the tops or vines, discharge the vines onto the ground, and either deposit the potatoes in piles on the ground or feed the potatoes to sacks, as may be desired; and it consists in the peculiar construction and combination of devices hereinafter fully set forth and claimed.

Figure 1:
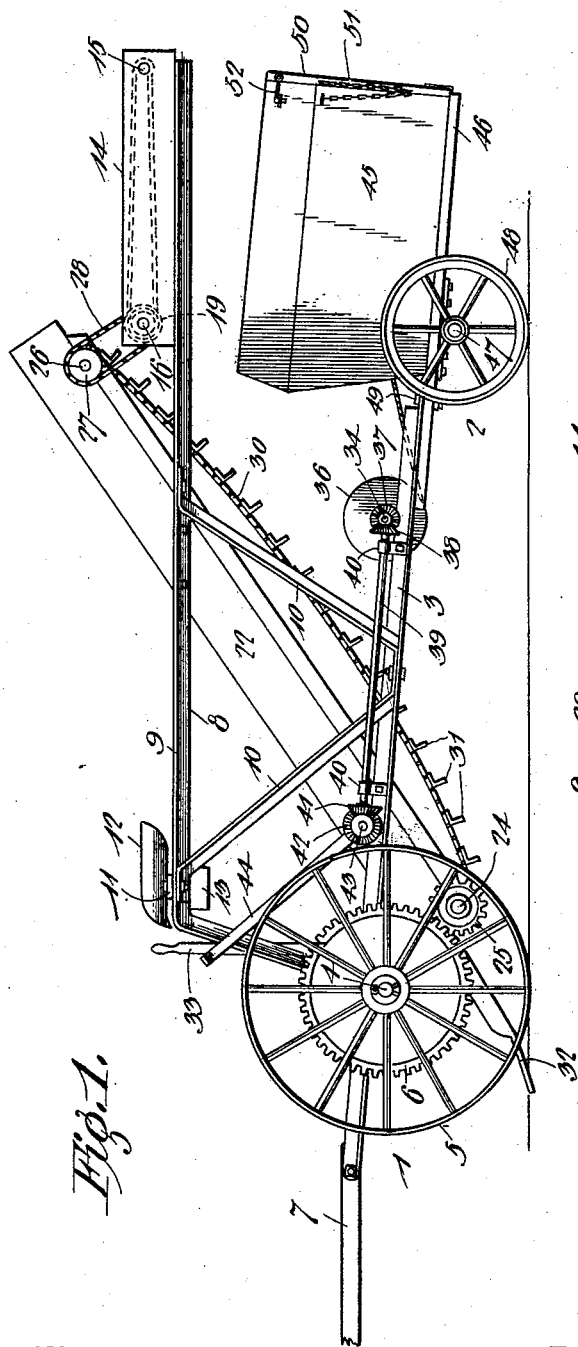
Figure 2:
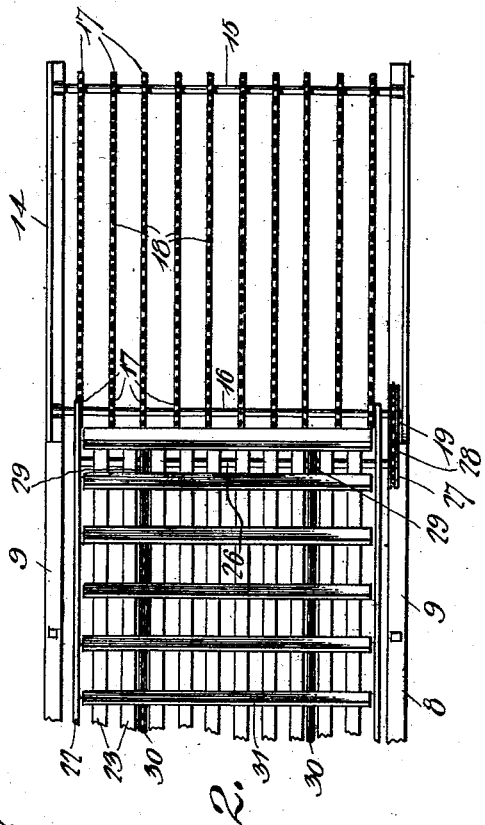

In the accompanying drawings, Figure 1 is a side elevation of a potato-digger embodying my improvements. Fig. 2 is a partial top plan view of the same. Fig. 3 is a partial vertical sectional view of the same. Fig. 4 is a partial top plan view of the same and a horizontal sectional view taken on a plane indicated by the line $a\,a$ of Fig. 3.

My improved potato-digger has a front truck 1 and a rear truck 2. I will first describe the front truck.

An oblong frame 3, which is preferably of the form here shown, but which may be of any other suitable form, is supported near its front end on an axle 4, on which are supporting-wheels 5. Spur-wheels 6 rotate with said supporting-wheels 5. To the front end of the frame 3 is attached a draft-tongue 7. A rearwardly-extending frame 8 is carried by the frame 3, and the said frame 8 is preferably of the construction here shown, the sides 9 thereof being connected at their front ends to the sides of the frame 3 and being further supported by braces 10. A cross-bar 11 connects the sides 9 of frame 8 together near the front end of said frame, and the seat 12 for the driver is secured on the said cross-bar 11. A suitable tool-box 13 is secured under the said cross-bar 11. On the rear end of the frame 8 is a separating-frame 14, in the sides of which are journaled shafts 15 16, which are provided with suitable sprocket-wheels 17, appropriately spaced apart, and the sprocket-wheels of the said respective shafts are connected together by endless traveling separating-chains 18. On one end of the shaft 16 is a sprocket-wheel 19, which is indicated in dotted lines in Fig. 1.

An inclined elevator-frame 22 is supported and carried by the frame 3 and the frame 8, the sides of said elevator-frame being secured to the sides of said frames 3 and 8. The said elevator-frame is provided with suitable longitudinally-disposed bottom slats 23, which are spaced far enough apart to permit the dust dislodged from the potatoes by the friction on and motion of the potatoes while moving on said slats to fall between the latter to the ground. Near the lower end of said elevator-frame is journaled a shaft 24, which extends transversely across the elevator-frame and is provided with spur-wheels 25, which engage the spur-gears 6. Hence power is communicated to said shaft 24. Near the rear upper end of the elevator-frame is a shaft 26, at one end of which is a sprocket-wheel 27, which is connected by an endless chain 28 to the sprocket-wheel 19 on the separator-shaft 16. The said shafts 24 26 are provided with suitable sprocket-wheels 29, and the respective sprocket-wheels of said shafts are connected together by endless elevator-chains 30. Said elevator-chains are connected together by transversely-disposed elevating flights 31. At the lower end of the elevator-frame is a suitable potato-digging plow or scoop 32, which may be adjusted and caused to operate at any desired depth by means of a lever 33. Potatoes unearthed by the said plow or scoop pass upwardly over the same, owing to the forward motion of the machine, and are discharged onto the elevator, the earth being dislodged and discharged from the potatoes while traveling on the slats 23, as hereinbefore stated, and the potatoes and vines adhering thereto being dropped as they are discharged from the elevator onto the separating-chains 18, as will be understood. The separating-chains are spaced apart, so that the potatoes will drop from the vines between the said separating-chains.

A shaft 34 is journaled in suitable bearings 35 on the rear portion of the frame 3. Said shaft has a drum-pulley 36 at its center and is provided at one end with a miter-gear 37. The latter is engaged by a similar gear 38 on a shaft 39, which is disposed longitudinally on one side of the frame 3 and mounted in bearings 40. At the front end of said shaft 39 is a miter-gear 41, which is engaged by a similar gear 42, mounted on a suitable spindle or stud shaft 43 and adapted to be oscillated or partly turned in reverse directions by a hand-lever 44 to communicate similar motion to the shafts 39 and 34 through the connecting-gears hereinbefore described.

I will now describe the rear truck. A box or body 45 is carried on a frame 46, which has a supporting-axle 47, on which are supporting-wheels 48. The front portion of the frame 46 is overlapped by the rear end of the frame 3. A pivot or king bolt 49 connects the frames 3 and 46 together and causes the rear truck to be trailed and drawn behind the front truck. The major portion of the box or body is behind the axle 47 and extends considerably farther in rear than does the frame 46 in front thereof, so that the box or body acts as a lever which tends to lift the front of frame 46, the rear end of the frame 3, which bears thereon, and the rear end of the upper frame 8. At the rear end of the box or body 45 is a gate 50, which may be lowered to substantially a horizontal position, as indicated in dotted lines in Fig. 3, and is provided with chains 51 to support it when thus lowered and hooks 52 or other suitable devices to lock it when closed. The bottom of the box or body 45 is formed by a pair of dump-doors 53, which are hinged at their outer sides, as at 54, and are adapted to open downwardly. A direction-sheave 55 is suitably supported in the box or body above the said dump-doors, and a support for the said direction-sheave is here shown as a rod or bar 56. An operating-cord 57 is connected to the dump-doors, passes over the direction-sheave 55, and is attached to the drum-pulley 36, as at 58. It will be understood that the dump-doors may be caused to open or close by operating the hand-lever 44. It will be observed that the box or body 45 is disposed under the separating-chains, that the potatoes discharged onto the said separating-chains by the elevator drop through the spaces between said separating-chains into said box or body 45, and that said separating-chains serve to retain the vines and separate them from the potatoes and discharge the vines onto the ground in rear of the box or body 45.

The potatoes accumulate in the box or body 45 and may be discharged therefrom either through the gate 50 or the dump-doors 53. Within the scope of my invention I propose to provide a sacker 59 in the box or body 45, by means of which the potatoes may be conveyed as fast as they are dug to a sack 60, which is indicated in dotted lines in Fig. 3.

Having thus described my invention, I claim—

1. In a potato-harvester, a front truck having an axle and supporting-wheels thereon, a frame 3 on the axle and extending rearwardly therefrom, an upper rearwardly-extending frame 8, having the front portions of its side bars downturned and secured to the frame 3, braces connecting said frames together, and an elevator carried by said frames, in combination with a rear truck coupled to the frame 3, substantially as described.

2. In a potato-harvester, a front truck having rearwardly-extending frames 3, 8, the latter above the former, said frame 8 carrying the upper portion of an elevator and also carrying a separator, the latter being disposed in rear of the elevator, in combination with a rear truck to which the frame 3 is coupled, said rear truck carrying a receptacle for the potatoes, substantially as described.

3. In a potato-harvester a front truck having rearwardly-extending frames 3, 8, the latter above and extending in rear of the former, said frames carrying an elevator, in combination with a rear truck having an axle, supporting-wheels thereon, a frame extending in front of the axle, under the rear end of the frame, 3, and being overlapped thereby, coupled thereto and a counterbalancing potato-receptacle carried by said rear truck and extending rearwardly from the axle thereof, substantially as described.

In testimony that I claim the foregoing as my own I have hereto affixed my signature in the presence of two witnesses.

JOHN MORAN.

Witnesses:
MATH. KLOBRITCHER,
FRANK ADAMS.